T. R. LLOYD.
ANTISKID DEVICE.
APPLICATION FILED APR. 27, 1915.

1,249,433.

Patented Dec. 11, 1917.

WITNESSES
J. R. Keller
John F. Will

INVENTOR
Thomas R. Lloyd
by Kay Totten & Daniell
attys

UNITED STATES PATENT OFFICE.

THOMAS R. LLOYD, OF PITTSBURGH, PENNSYLVANIA, ASSIGNOR OF ONE-THIRD TO CHARLES UNMISSIG AND ONE-THIRD TO WILLIAM J. MILLER, BOTH OF PITTSBURGH, PENNSYLVANIA.

ANTISKID DEVICE.

1,249,433.

Specification of Letters Patent.

Patented Dec. 11, 1917.

Application filed April 27, 1915. Serial No. 24,258.

*To all whom it may concern:*

Be it known that I, THOMAS R. LLOYD, a citizen of the United States, and resident of Pittsburgh, in the county of Allegheny and State of Pennsylvania, have invented a new and useful Improvement in Antiskid Devices; and I do hereby declare the following to be a full, clear, and exact description thereof.

My invention relates to an anti-slipping device for automobile wheels and the like, and is particularly, though not exclusively, designed for use upon the wheels of heavy trucks. The invention is an improvement upon the construction described and claimed in the co-pending application of Unmissig & Miller, Serial No. 808,885.

The object of the invention is to simplify the construction of devices of this character by utilizing a portion of the wheel construction as a means of mounting chains on the wheel; and furthermore, to provide improved means for retaining the chain-holding pins in place.

Figure 1:
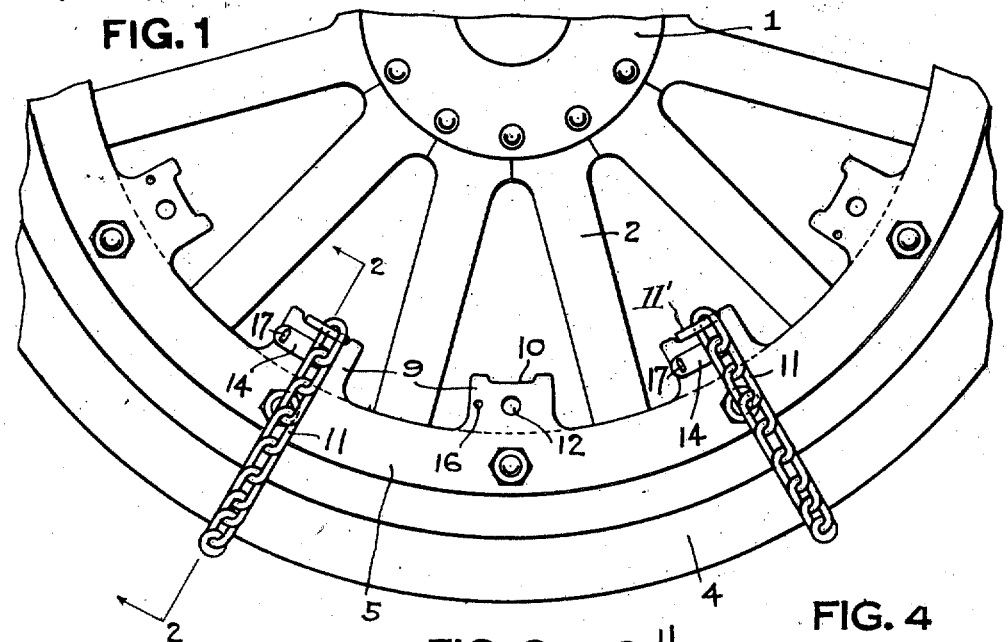
Figures 2, 3, 4:
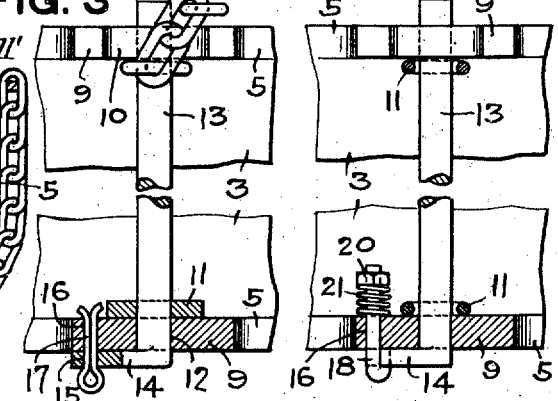
Figure 7:
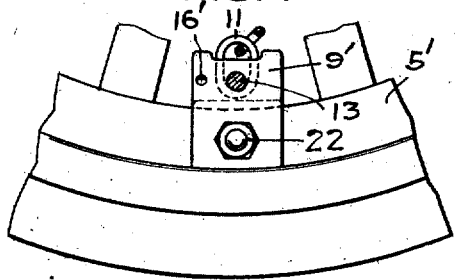
Figure 5:
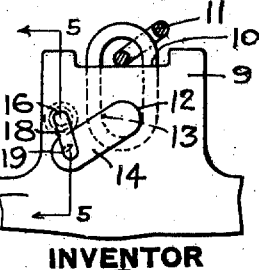
Figure 6:
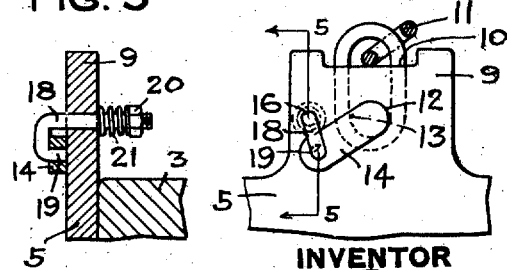

A preferred embodiment of the invention is illustrated in the accompanying drawings in which Figure 1 is a fragmentary side elevation of a vehicle wheel embodying my invention; Fig. 2 is a sectional view taken transversely of the rim of the wheel, on the line 2—2, Fig. 1; Fig. 3 is a detail view partly in section looking from the axle toward the rim of the wheel; Fig. 4 is a view similar to Fig. 3, of a modification of the construction; Fig. 5 is an enlarged detail view of pin-retaining device taken on the line 5—5, Fig. 6; Fig. 6 is a side elevation of the parts shown in Fig. 5; and Fig. 7 is a view similar to Fig. 6 showing a modified construction.

The form of the invention herein selected for illustration comprises the usual vehicle wheel having the hub 1, spokes 2, felly 3 and usual resilient tire 4. In the usual construction of wheels for heavy trucks, the felly has upon either side thereof a clamping ring or plate 5, having an annular groove portion 6 adapted to clamp upon a bead 7 molded upon one of the resilient tire sections 4. In the construction here shown, the felly is provided with a rim plate 8 having a central annular grooved rib 9 for the reception of and holding of the beads 7 on the inner faces of the resilient tire members 4. The clamping plates or rings 5 are, as a rule, made of substantially the same depth as the felly 3 of the wheel, but for the purpose of using these rings or plates as parts of my improved anti-skid device, I provide these rings or plates with the inwardly extending lugs 9. In the showing of the invention, Fig. 1, a lug is shown between each of the spokes of the wheel, but it is obvious that the number of lugs may be decreased to any desired extent. Each of these lugs is provided with a recess or inset portion 10 for the reception of the end of the anti-skid chain 11, and each lug 9 is also apertured at 12 to receive a chain fastening pin 13. Each of the chains may, if desired, be provided with an angular fastening plate 11', as shown in Figs. 1 and 2, by which the chain may be secured to the rings 5 instead of merely by the end links. In the embodiment of the invention as here illustrated, the chain-fastening pin 13 is provided with a lateral offset head 14, which is apertured near its outer end as at 15, at a distance from the axis of the pin corresponding to the distance a second aperture 16 in the securing lug 9 is positioned from the axis of the pin-receiving opening 12 in said lug 9.

The manner of assembling the chains upon the wheel is as follows:—One end of the chain is placed against the inner side of one of the lugs 9 with a link registering with the aperture 12 therein. The chain-securing pin 13 is then thrust through said lug 9 and the link of the chain adjacent thereto. The chain is then passed over the tire and its opposite end brought against the inner side of the lug 9 on the opposite side of the rim of the wheel, and its link in register with the aperture 12 in said lug. The pin 13 is then thrust through this opposite end of the chain and said lug 9 and shoved home until the hub 14 of the pin rests against the outer face of the adjacent lug 9.

Having thus assembled the chain pin on the wheel, the pin may be secured in place in either one of two ways:—

First. The aperture 15 in the head 14 may be brought into register with the aperture 16 of the lug 9, and a cotter pin 17 may be then thrust through the head and lug and the ends of the pin spread as shown in Fig. 3 to prevent accidental withdrawing of the cotter pin.

Or, referring to Fig. 4, the aperture 16 of the lug 9 may have mounted therein a spring-actuated hook 18 having a tongue 19 and having a threaded inner end upon which a nut 20 is mounted, and interposed between the nut and the inner wall of the lug 9 is a spring 21, which normally tends to draw the tongue 19 of the hook against the outer face of the lug 9. When, now, the pin 13 is thrust home the hook 18 may be drawn up against the tension of the spring 21 and the tongue 19 of said hook may be snapped into the aperture 15 of the lateral head 14 of the pin 13, thereupon holding the pin firmly in chain-securing position.

The form of the invention illustrated in Fig. 7 is similar to that heretofore described, but in case it is desired to save the expense of providing a plate or ring 5 of special construction, the ordinary ring 5' usually found on wheels of this character may be used and the lug 9' may be a separate piece bolted to the ring 5' and the wheel rim by means of one of the bolts 22 by which said plate or ring 5' is secured to the wheel. In other respects, the lug 9' is of similar construction to the lug 9 heretofore described.

Changes in the construction and arrangement of parts may, of course, be made within the scope of the appended claims.

What I claim is:

1. An anti-skid device comprising the combination with a vehicle wheel, and a pair of plate rings secured on the outer and inner faces respectively of the felly of the wheel, lugs extending inwardly from said rings, said lugs having apertures for the reception of a chain-retaining pin, a chain having its opposite ends adapted to be secured by said pin within the inner faces of said lugs, and means for holding said pin in chain-holding position in said lugs.

2. An anti-skid device comprising the combination with a vehicle wheel, and a pair of plate rings secured on the outer and inner faces respectively of the felly of the wheel, lugs extending inwardly from said rings, said lugs having apertures for the reception of a chain-retaining pin, a chain having its opposite ends adapted to be secured by said pin within the inner faces of said lugs, said pin having a lateral extension at one end provided with an aperture, the lugs of one of said plate rings also being apertured whereby a securing pin may be passed through the apertures in said extension and lug respectively to secure the pin in chain-holding position.

3. An anti-skid device comprising the combination with a vehicle wheel, and a pair of plate rings secured on the outer and inner faces respectively of the felly of the wheel, lugs extending inwardly from said rings, said lugs having apertures for the reception of a chain-retaining pin, a chain having its opposite ends adapted to be secured by said pin within the inner faces of said lugs, said pin having a lateral extension at one end provided with an aperture, a spring-actuated hook extending through said lug aperture, the tongue of said hook being adapted to engage the aperture in said lateral extension of the pin and be held in pin-securing position by the tension of said spring.

In testimony whereof I, the said THOMAS R. LLOYD, have hereunto set my hand.

THOMAS R. LLOYD.

Witnesses:
W. J. BOEHM, Jr.,
CHARLES UNMISSIG,
ALBERT J. HALTER.

Copies of this patent may be obtained for five cents each, by addressing the "Commissioner of Patents, Washington, D. C."